United States Patent
Jun (10) Patent No.: US 7,068,737 B2
(45) Date of Patent: *Jun. 27, 2006

(54) DIGITAL TV RECEIVER

(75) Inventor: Jung Sig Jun, Seongnam-si (KR)

(73) Assignee: LG Electronics Inc., Seoul (KR)

( * ) Notice: Subject to any disclaimer, the term of this patent is extended or adjusted under 35 U.S.C. 154(b) by 80 days.

This patent is subject to a terminal disclaimer.

(21) Appl. No.: 10/720,472

(22) Filed: Nov. 25, 2003

(65) Prior Publication Data

US 2004/0150753 A1    Aug. 5, 2004

(30) Foreign Application Priority Data

Nov. 27, 2002    (KR) .................. P10-2002-0074221

(51) Int. Cl.
*H04L 27/22* (2006.01)
(52) U.S. Cl. ...................................... 375/326
(58) Field of Classification Search ............... 375/261, 375/316, 321, 326, 340, 350, 270, 355, 327; 348/725, 726, 325; 329/304, 306, 307, 308, 329/357
See application file for complete search history.

(56) References Cited

U.S. PATENT DOCUMENTS

| | | | | |
|---|---|---|---|---|
| 5,673,293 | A * | 9/1997 | Scarpa et al. | 375/321 |
| 5,872,815 | A * | 2/1999 | Strolle et al. | 375/321 |
| 6,160,443 | A * | 12/2000 | Maalej et al. | 329/304 |
| 6,862,325 | B1 * | 3/2005 | Gay-Bellile et al. | 375/340 |

* cited by examiner

*Primary Examiner*—Robert Pascal
*Assistant Examiner*—Krista M. Flanagan
(74) *Attorney, Agent, or Firm*—Birch, Stewart, Kolasch & Birch, LLP (57) ABSTRACT

A device of digital TV receiver includes an A/D converter for converting an analog passband signal into a digital passband signal, a carrier recovery for converting the digital passband signal into a digital baseband signal, and a symbol clock recovery for calculating the digital passband real/imaginary signals of the A/D converter or the digital baseband real/imaginary signals of the carrier recovery and squaring the calculated result, detecting timing error information, and generating and outputting two times the frequency of a symbol clock recovered from the detected timing error information.

23 Claims, 8 Drawing Sheets

DIGITAL TV RECEIVER

CROSS-REFERENCE TO RELATED APPLICATIONS

This application claims the benefit of Korean Application No. P2002-74221, filed on Nov. 27, 2002, which is hereby incorporated by reference as if fully set forth herein.

BACKGROUND OF THE INVENTION

1. Field of the Invention

The present invention relates to a digital TV, and more particularly, to an apparatus of a digital TV receiver for recovering a symbol clock from received data.

2. Discussion of the Related Art

An advanced television systems committee (ATSC) 8 VSB (Vestigial Side Band) transmission system proposed by most current digital transmission systems and a US directed digital TV transmission mode loads data only in a transmission signal to increase an effect of a frequency. That is, clock information needed for data recovery at a receiving party is not transmitted. Therefore, the same clock as that employed during the transmission should be generated among the received signals having only data to recover the data at the receiving party. A symbol clock recovery performs the role.

Figure 1:
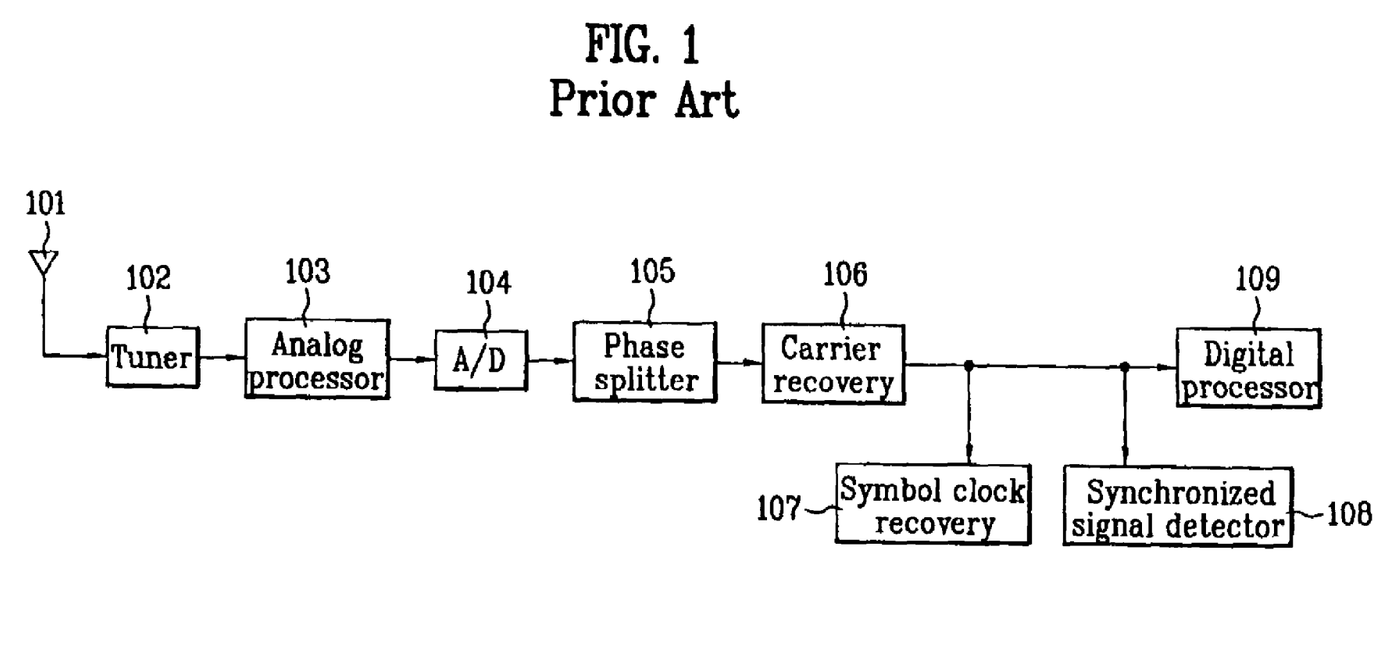
FIG. 1 illustrates a block diagram of a conventional digital TV receiver.

FIG. 1 is a block diagram illustrating a general digital TV receiver having such symbol clock recovery. Referring to FIG. 1, if a radio frequency (RF) signal modulated in a VSB mode is received through an antenna 101, a tuner 102 selects a desired channel frequency. Then, the tuner 102 converts a VSB signal of an RF band inserted in the channel frequency to a first intermediate frequency (IF) band, and outputs to an analog processor 103. The analog processor 103 performs passband filtering and gain controlling to the first IF signal outputted from the tuner 102 for converting the first IF signal into a second IF signal, and outputs to an A/D(Analog/Digital) converter 104. The A/D converter 104 samples the second IF signal at a fixed frequency (i.e., the fixed frequency is different from the symbol clock frequency, and normally 25 MHz), and outputs to a phase splitter 105. That is, the data sampled at 21.52 MHz two times the frequency of the symbol clock is received at the receiving part although the outputted data from the A/D converter 104 is digital data sampled at 25 MHz.

The phase splitter 105 splits the digital signal into a passband real signal r(t) and a passband imaginary signal (i(t)), and outputs the signal to the carrier recovery 106. At this time, for easier description, the real/imaginary signals outputted from the phase splitter 105 is named as I and Q signals, respectively.

The carrier recovery 106 converts the digital signals I and Q of the passband outputted from the phase splitter 105 to a baseband. The output signal of the carrier recovery 106 is inputted to a symbol clock recovery 107, a synchronized signal detector 108 and a digital processor 109.

At this time, the symbol clock recovery 107 recovers all the symbol clocks employed by the digital processor 109 using the baseband signal output from the carrier recovery 106 and the synchronized signal detector 108 detects a segment sync and a field sync from the digital baseband signal.

Figure 2:
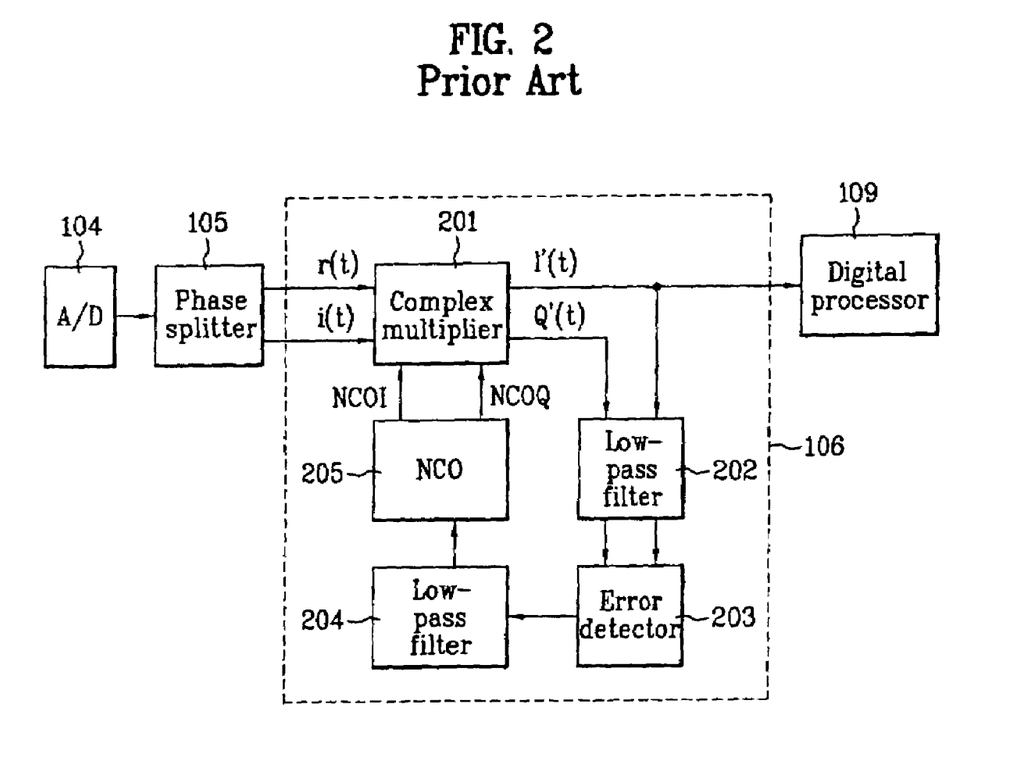
FIG. 2 is a block diagram illustrating a conventional carrier recovery of FIG. 1.

FIG. 2 is a block diagram of the carrier recovery 106 employing a FPLL (Frequency Phase Locked Loop). That is, the carrier recovery 106 having the FPLL demodulates the passband I and Q signals outputted from the phase splitter 105 into the baseband I and Q signals for frequency and phase locking.

Referring to FIG. 2, the passband I and Q signals being digitized through the A/D converter 104 and the phase splitter 105 are inputted to a complex multiplier 201 of the carrier recovery 106. At this time, the real signal (r(t)) and the imaginary signal (q(t)) outputted from the phase splitter 105 is expressed as a following formula.

$r(t)=\{I(t)+p\} \cos(w_c t+\Psi)-Q(t)\sin(w_c t+\Psi)$ $i(t)=\{I(t)+p\} \sin(w_c t+\Psi)+Q(t)\cos(w_c t+\Psi)$ [Formula 1]

I(t) is a signal before a modulation and p is a pilot signal inputted to the transmitter for the carrier recovery 106. Also, $w_c$ is the frequency of the carrier signal existing in an input signal and psi($\Psi$) is a phase of the carrier signal existing in the input signal. Q(t) is an orthogonal signal component of I(t).

Meanwhile, the complex multiplier 201 of the carrier recovery 106 multiplies the passband I and Q signals as the formula 1 by a standard carrier signals NCO(Number Controlled Oscillator)I and NCOQ outputted from the NCO 205, and converts the passband I and Q signal into the baseband I and Q signals (I'(t),Q'(t)) as a following formula 2.

$I'(t)=\{I(t)+p\} \cos(\Delta w_c t+\Psi)-Q(t)\sin(\Delta w_c t+\Psi)$ $Q'(t)=\{I(t)+p\} \sin(\Delta w_c t+\Psi)+Q(t)\cos(\Delta w_c t+\Psi)$ [Formula 2]

The $\Delta w_c$ is a beat frequency of the carrier signal $w_c$ employed by the transmitter and the standard carrier signals NCOI and NCOQ generated from the receiver.

The baseband I and Q signals(I'(t),Q'(t)) of the baseband are outputted to a low pass filter 202 as well as to the symbol clock recovery 107, the synchronized signal detector 108 and the digital processor 109.

The low-pass filter 202 filters the baseband I and Q signals(I'(t),Q'(t)) to extract the carrier and outputs to an error detector 203. That is, the carrier recovery 106 recovering the carrier needs only signals around the frequency having the pilot frequency in a band width of 6 MHz and, therefore, the low-pass filter 202 prevents the efficiency of the carrier recovery from being reduced by removing the remaining frequency component having data component from the I and Q signals.

The error detector 203 detects remaining error of the carrier from the carrier signal, and outputs to the low-pass filter 204. That is, the remaining carrier error detected from the error detector 203 is outputted to an NCO 205 through the low-pass filter 204 to prevent errors from being accidentally detected. The NCO 205 generates new carrier signals NCOI and NCOQ and outputs to the complex multiplier 201.

If the carrier recovery is completely performed at the carrier recovery 106, $\Delta w_c t$ and $\Psi$ become '0', and the formula 2 will be changed to a following formula 3.

$I'(t)=I(t)+p$ $Q'(t)=Q(t)$ [Formula 3]

The symbol clock recovery 107 performs the symbol clock recovery from the signal of the formula 3 and generates the symbol clocks employed in all digital areas of the receiver.

However, if the carrier recovery is not completely carried out in the carrier recovery 106, the symbol clock recovery 107 recovers the symbol clock from the signal of the formula 2. Thus, the symbol clock recovery is not normally performed being influenced by the frequency and the phase between the carrier signals employed by the receiver and the standard carrier signal generated from the receiver such as $\Delta w_c$, and $\Psi$.

In other words, as described in FIG. 1, the performance of the carrier recovery largely influences the performance of the symbol clock recovery in a structure in which the carrier recovery and the symbol clock recovery is connected. The symbol clock recovery is influenced by the remaining frequency and phase error not completely removed from the carrier recovery, and that gives bad influence on the total performance of the symbol clock recovery.

The reason why the symbol clock recovery is located at an end of the general carrier recovery is that the symbol clock recovery is designed under an assumption that the role of the carrier recovery is completed. Therefore, if the carrier recovery is not completely performed, the symbol clock recovery is not performed as well.

SUMMARY OF THE INVENTION

Accordingly, the present invention is directed to an apparatus and a digital TV receiver for recovering a symbol clock that substantially obviates one or more problems due to limitations and disadvantages of the related art.

An object of the present invention is to provide a digital TV receiver for recovering a symbol clock irrespective of the remaining phase and phase error of the carrier recovery.

Another object of the present invention is to provide a digital TV receiver for enabling a symbol clock recovery even when fs/2 frequency taking timing error information is damaged by a ghost and the like.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, the digital TV receiver includes an A/D converter for converting an analog passband signal into a digital passband signal, a carrier recovery for converting the digital passband signal into a digital baseband signal, a symbol clock recovery for detecting timing error information by calculating a digital passband real signal and a digital passband imaginary signal or a digital baseband real signal and a digital baseband imaginary signal from the A/D converter and squaring the calculated result, generating and outputting two times frequency of the symbol clock corrected from the detected timing error information.

In another aspect of the present invention, the digital TV receiver includes an A/D converter for sampling an analog passband signal with a fixed frequency generated from a fixed oscillator and converting the digital passband signal, the carrier recovery for multiplying the digital passband signal by a standard carrier signal generated from the carrier recovery to convert the digital passband signal into a digital baseband signal, a first resampler for resampling the digital baseband real/imaginary signals generated from the carrier recovery to two times frequency and interpolating each of them, the symbol clock recovery for detecting timing error information by calculating the digital passband signal or the digital baseband signal and squaring the calculated result, and for generating and outputting two times frequency recovered from the detected timing error information.

In this case, the symbol clock recovery includes an operator for calculating each of the digital baseband real/imaginary signals being interpolated and outputted from the first resampler, and outputting the calculation; a multiplier for multiplying the output value of the operator; a pre-filter for passing only a frequency of a particular band to recover the symbol clock from the output of the operator; a timing error detector for detecting timing error information from the output of the pre-filter; a filtering unit for filtering only a low passband signal from the timing error information outputted from the timing error detector; and a NCO for generating two times the frequency of the symbol clock recovered according to low pass signal component of the filtered timing error information and outputting to the first resampler.

Also, the operator may squares each of the digital baseband real/imaginary signals interpolated and outputted from the first resampler, adds the two squared signals and outputs the calculation; or calculates an absolute value for each of the digital baseband real/imaginary signals interpolated and outputted from the first resampler, adds the absolute value of the two signals and outputs the calculation.

The symbol clock recovery includes a second resampler for resampling the digital passband real/imaginary signals outputted from the A/D converter into the two times frequency of the symbol clock frequency and interpolating each of the signals; a operator for calculating the digital passband real/imaginary signals outputted from the second resampler and outputting the calculation; a multiplier for multiplying the output value of the operator; a pre-filter for passing only a frequency of a particular band to recover the symbol clock from the output of the operator; a timing error detector for detecting timing error information from the output of the pre-filter; a filtering unit for filtering only the low passband signal from the timing error information outputted from the timing error detector; and a NCO for generating two times the frequency of the symbol clock recovered according to low pass signal component of the filtered timing error information and outputting to the first resampler and the second resampler.

In this case, the operator squares each of the digital passband real/imaginary signals interpolated and outputted from the second resampler, adds the two squared signals and outputs the calculation; or calculate an absolute value for each of the digital passband real/imaginary signals interpolated and outputted from the second resampler, adds the absolute value of the two signals and outputs the calculation.

The present invention includes an A/D converter for sampling an analog passband signal with two times the frequency of a symbol clock for converting the analog passband signal into a digital passband signal; a carrier recovery for multiplying a standard carrier signal generated from the process of the carrier recovery by the digital passband signal and converting into the digital baseband signal; and a symbol clock recovery for detecting timing error information by calculating the digital passband signal or the digital baseband signal and squaring the calculated result, and for generating and outputting the two times frequency of the symbol clock frequency corrected from the detected timing error information.

The symbol clock recovery includes an operator for calculating each of the digital baseband real/imaginary signals outputted from the carrier recovery, and outputting the calculation; a multiplier for multiplying the output value of the operator; a pre-filter for passing only a frequency of a particular band to recover the symbol clock from the output of the operator; a timing error detector for detecting timing error information from the output of the pre-filter; a filtering unit for filtering only the low passband signal from the timing error information outputted from the timing error detector; and a variable oscillator for generating two times the frequency of the symbol clock recovered according to low pass signal component of the filtered timing error information and outputting to the A/D converter.

In this case, the operator squares each of the digital baseband real/imaginary signals interpolated and outputted from the carrier recovery, adds the two squared signals, and outputs the calculation; or calculate an absolute value for each of the digital baseband real/imaginary signals interpolated and outputted from the carrier recovery, adds the absolute value of the two signals, and outputs the calculation.

Also, the symbol clock recovery includes an operator for calculating each of the digital passband real/imaginary signals outputted from the A/D converter, and outputting the calculation; a multiplier for multiplying the output value of the operator; a pre-filter for passing only a frequency of a particular band to recover the symbol clock from the output of the operator; a timing error detector for detecting timing error information from the output of the pre-filter; a filtering unit for filtering only the low passband signal from the timing error information outputted from the timing error detector; and a variable oscillator for generating two times the frequency of the symbol clock recovered according to low pass signal component of the filtered timing error information, and outputting to the A/D converter.

In this case, the operator squares each of the digital passband real/imaginary signals outputted from the A/D converter, adds the two squared signals, and outputs the calculation; or calculate an absolute value for each of the digital passband real/imaginary signals outputted from the A/D converter, adds the absolute value of the two signals, and outputs the calculation.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Figure 3:
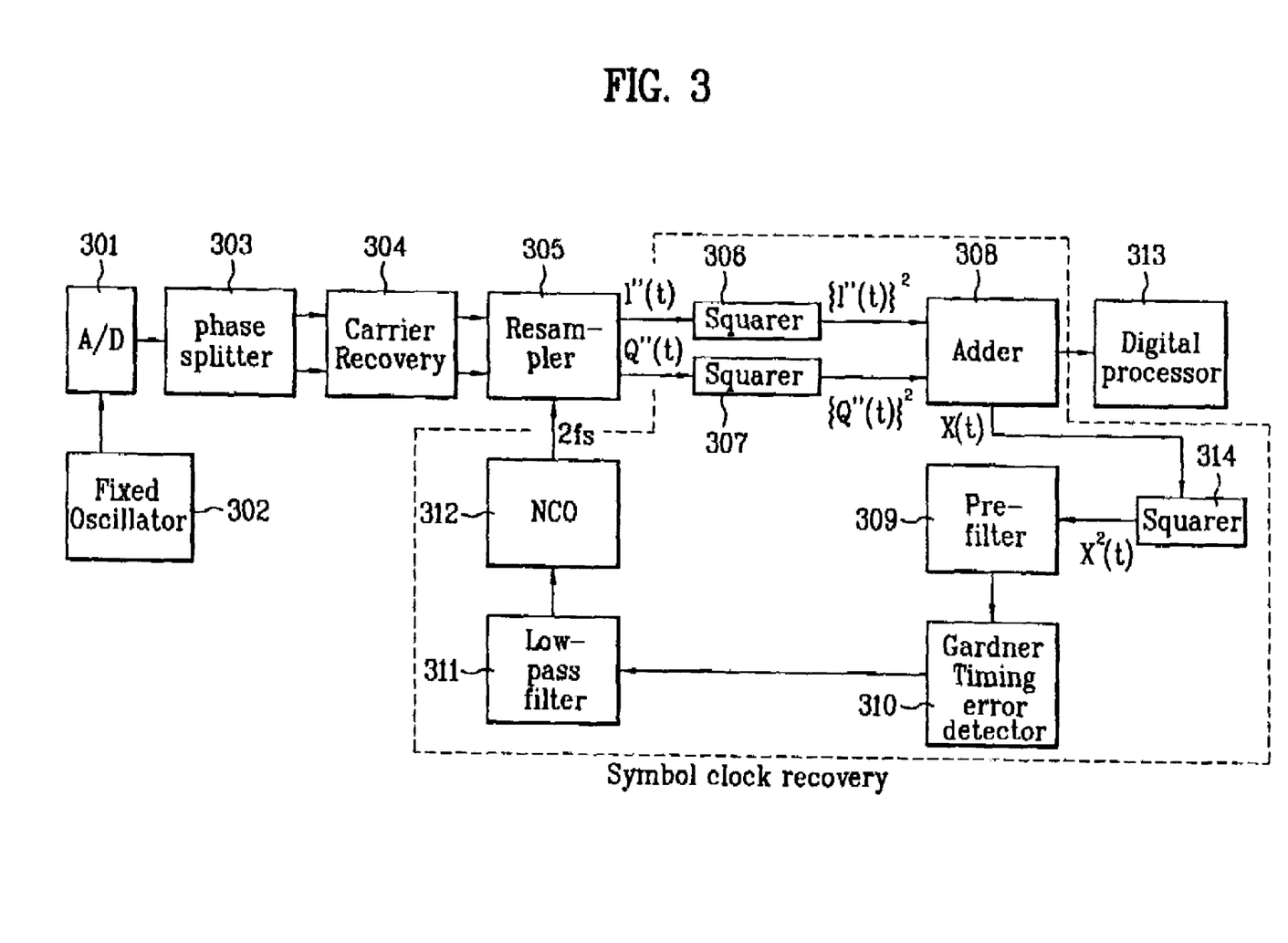
FIG. 3 is a block diagram illustrating a digital TV receiver having a symbol clock recovery according to a first embodiment of the present invention.

FIG. 3 is a block diagram of a digital TV receiver having a symbol clock recovery according to the present invention. Here, a digital processor 313 of FIG. 3 performs the same operation and function as the digital processor 109 of FIG. 1. As illustrated in FIG. 3, the A/D converter 301 takes a sample of a fixed frequency from an analog passband signal, changes to a digital passband signal and outputted to phase splitter 303. In this case, the fixed frequency oscillated in the fixed oscillator 302 is higher than two times the frequency of the symbol clock.

The phase splitter 303 separates the digital passband signal into a real signal (I) and an imaginary signal (Q), and outputs to a carrier recovery 304. The carrier recovery 304 multiplies the digital passband I and Q signals by a standard carrier signal, converts the digital passband I and Q signals into the digital baseband I and Q signals and outputs the digital passband I and Q signals to a resampler 305. The resampler 305 samples the baseband I and Q signals at a two times frequency of the symbol clock frequency outputted from the symbol clock recovery and outputs the interpolated signal(I"(t),Q"(t)) to the symbol clock recovery.

The symbol clock recovery includes a first squarer 306 for squaring the digital passband real signal (I"(t)), a second squarer 307 for squaring the imaginary signal (Q"(t)), an adder 308 for adding the two squared values($\{I''(t)\}^2$, $\{Q''(t)\}^2$) outputted from the first and second squarers 306 and 307, a third squarer 314 for squaring an output of the adder 308, a pre-filter 309 for passing only an edge part in the output spectrum of the third squarer 314, a Gardner timing error detector 310 for detecting timing error information from a signal passed through the pre-filter 309, a low-pass filter 311 for filtering only low-pass signals from timing error information outputted from the Gardner timing error detector 310, an NCO 312 for generating two times frequency of the symbol clock according to the low-pass component of the timing error information and controlling sampling timing of the resampler 305.

The first squarer 306 in the symbol clock recovery of the present invention composed as aforementioned squares the baseband I signal (I"(t)) interpolated and outputted from the resampler 305 and the second squarer 307 squares the baseband Q signal(Q"(t)) interpolated and outputted from the resampler 305 and outputs to the adder 308. When the two squared signals are added at the adder 308, the signals are converted into the baseband I and Q signals from which the carrier component is removed.

In this instance, input formulas {I"(t), Q"(t)} of the first and second squarers 306 and 307 are described as a formula 3 if the carrier recovery is completely carried out or as a formula 2 if the carrier recovery is not completely carried out. The output of the first and second squarers 306 and 307 is the same as a following formula 4 when the carrier recovery is completed.

$$\{I''(t)\}^2 = \{I(t)+p\}^2 = I^2(t)+p^2+2pI(t)$$

$$\{Q''(t)\}^2 = Q^2(t) \qquad \text{[Formula 4]}$$

If the carrier recovery is not completely carried out, the output of the first and second squarers 306 and 307 is the same as the following formula 5.

$$\{I''(t)\}^2 = [\{I(t)+p\}\cos(\Delta w_c t + \Psi)]^2 \qquad \text{[Formula 5]}$$
$$= \{I(t)+p\}^2 \cos^2(\Delta w_c t + \Psi) +$$
$$Q^2(t)\sin^2(\Delta w_c t + \Psi) -$$
$$2\{I(t)+p\}Q(t)\cos(\Delta w_c t + \Psi)\sin(\Delta w_c t + \Psi)$$
$$\{Q''(t)\}^2 = [\{I(t)+p\}\sin(\Delta w_c t + \Psi) +$$
$$Q(t)\cos(\Delta w_c t + \Psi)]^2$$
$$= \{I(t)+p\}^2 \sin^2(\Delta w_c t + \Psi) +$$
$$Q^2(t)\cos^2(\Delta w_c t + \Psi) +$$
$$2\{I(t)+p\}Q(t)\cos(\Delta w_c t + \Psi)\cos(\Delta w_c t + \Psi)$$

The output of the adder 308 for adding the output of the first and second squarers 306 and 307 is the same as the following formula 6 in both cases when the carrier recovery is completely carried out and when not carried out.

$$X(t) = I^2(t) + Q^2(t)p^2 + 2pI(t) \qquad \text{[Formula 6]}$$

When the symbol clock recovery is carried out from the output of the adder 308, the symbol clock recovery can be carried out without interference of a carrier.

The output of adder 308 for removing the frequency and the phase error components of the carrier outputted from the carrier recovery 304 is inputted to a third squarer 314 to enable the symbol clock recovery when there is no information in half frequency (fs/2) of the frequency of the symbol clock. The output of the third squarer 314 is inputted to the Gardner timing error detector 310 through the pre-filter 309 passing only the edge part of the spectrum.

Figure 4:
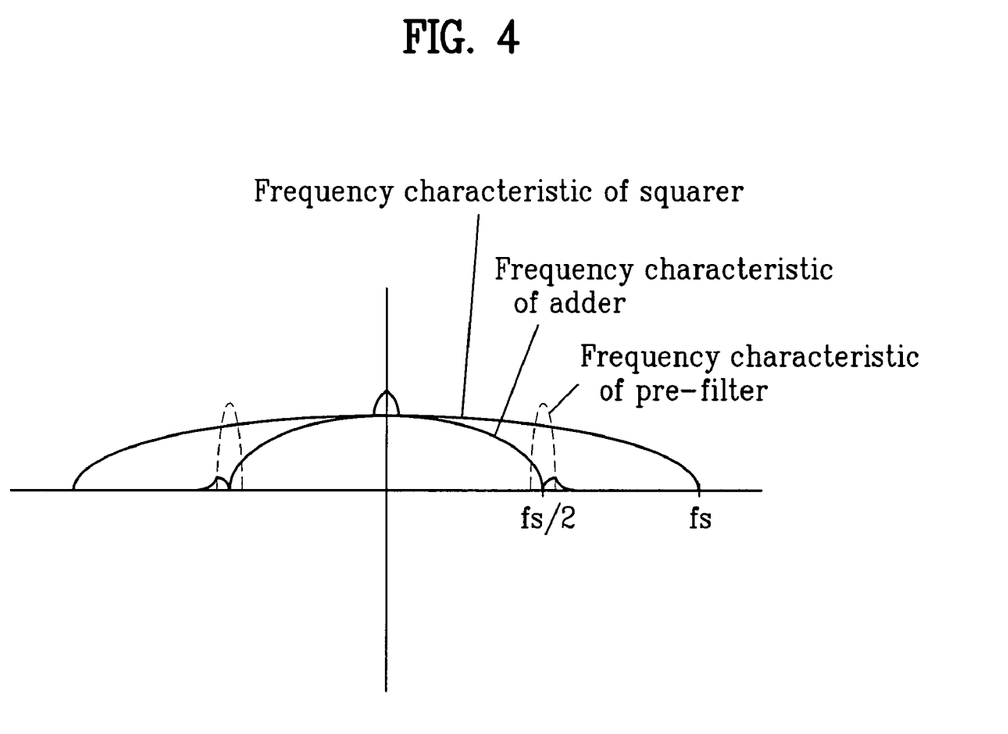
FIG. 4 is a diagram illustrating frequency characteristics outputted from an adder, a third multiplier and a pre-filter of a symbol clock recovery of FIG. 3.

FIG. 4 shows frequency characteristics of the output signal outputted from the adder 308, the third squarer 314 and the pre-filter 309 when there is a delayed inphase linear noise on the transmission channel. As shown in FIG. 4, the frequency characteristic of the output signal of the adder 308 is that information of the half frequency fs/2 of the symbol clock frequency is totally removed. However, the frequency characteristic of the output signal of the third squarer 314 is that new information of the half frequency fs/2 of the symbol clock frequency exists therein. That is because a ¼ frequency component fs/4 of the symbol clock frequency is transited when the output of the adder 308 is squared. The pre-filter 309 filters around the half frequency fs/2 of the symbol clock frequency from the output of the third squarer 314 and outputs to the Gardner timing error detector 310. The Gardner timing error detector 310 is able to extract the timing error information of the symbol clock, and therefore the symbol clock recovery is performed. The timing error information detected from the Gardner timing error detector 310 is inputted to the NCO 312 through the low-pass filter 311 and the NCO 312 generates new corrected two times frequency of the symbol clock frequency (2fs, fs is the frequency of the symbol clock) from the low-pass filtered timing error information.

In this case, the same result as that of FIG. 4 is produced from squaring the real signal outputted from the resampler 305 and inputting the squared real signal to the pre-filter 309 not using the first and second squarers 306 and 307 and the adder 308 but using only the third squarer 314.

In this case, however, it is impossible to normally perform the symbol clock recovery because the influence of the carrier signal component included in the real signal is transited together and thus an incomplete symbol clock recovery is performed.

Figure 5:
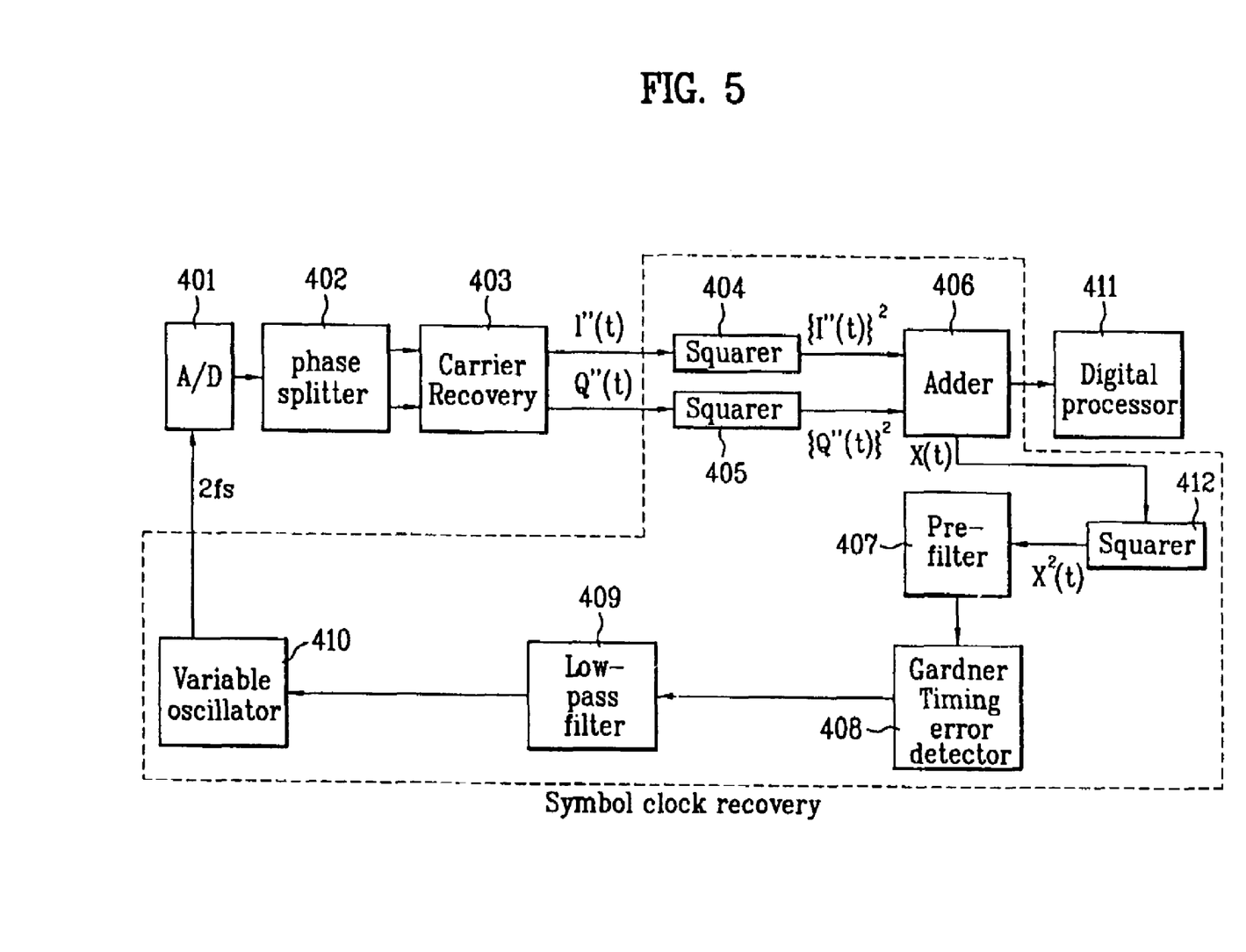
FIG. 5 is a block diagram illustrating a digital TV receiver having a symbol clock recovery according to a second embodiment of the present invention.

FIG. 5 illustrates an embodiment performing the same operations and functions as those described in FIG. 3. However, in this case, the clock frequency that is inputted to an A/D converter 401 is two times the frequency of the symbol clock frequency (2fs), instead of a fixed frequency.

Referring to FIG. 5, an A/D converter 401 samples the analog passband signal with two times the frequency of the symbol clock frequency (2fs) for converting the analog passband signal to a digital passband signal. Therefore, a resampler is not required between a carrier recovery 403 and two squarers 404 and 405. Thus, the load of the hardware can be reduced.

A low passband filter 409 filters low passband signal from timing error information of a current symbol that is outputted from a timing error detector 408. An output of the low passband filter 409 is inputted to a variable oscillator 410, which newly generates a two times frequency of the symbol clock frequency (2fs). Thereafter, the newly generated two times frequency of the symbol clock frequency (2fs), which is generated based on the low passband-filtered timing error information by the variable oscillator 410, is inputted to the A/D converter 401. Herein, the functions of a phase splitter 402, a carrier recovery 403, a first and second squarers 404 and 405, an adder 406, a pre-filter 407, a Gardner timing error detector 408, a digital processor 411, and a squarer 412 perform the same operations and functions as a phase splitter 303, a carrier recovery 304, a first and second squarers 306 and 307, an adder 308, a pre-filter 309, a Gardner timing error detector 310, a digital processor 313, and a squarer 314 described in FIG. 3.

Meanwhile, when the symbol clock recovery uses the two squarers and the adder in order to recover the symbol clock, the symbol clock recovery is not affected by the carrier recovery. Therefore, the symbol clock can be recovered from a passband signal that does not pass through the carrier recovery.

Figure 6:
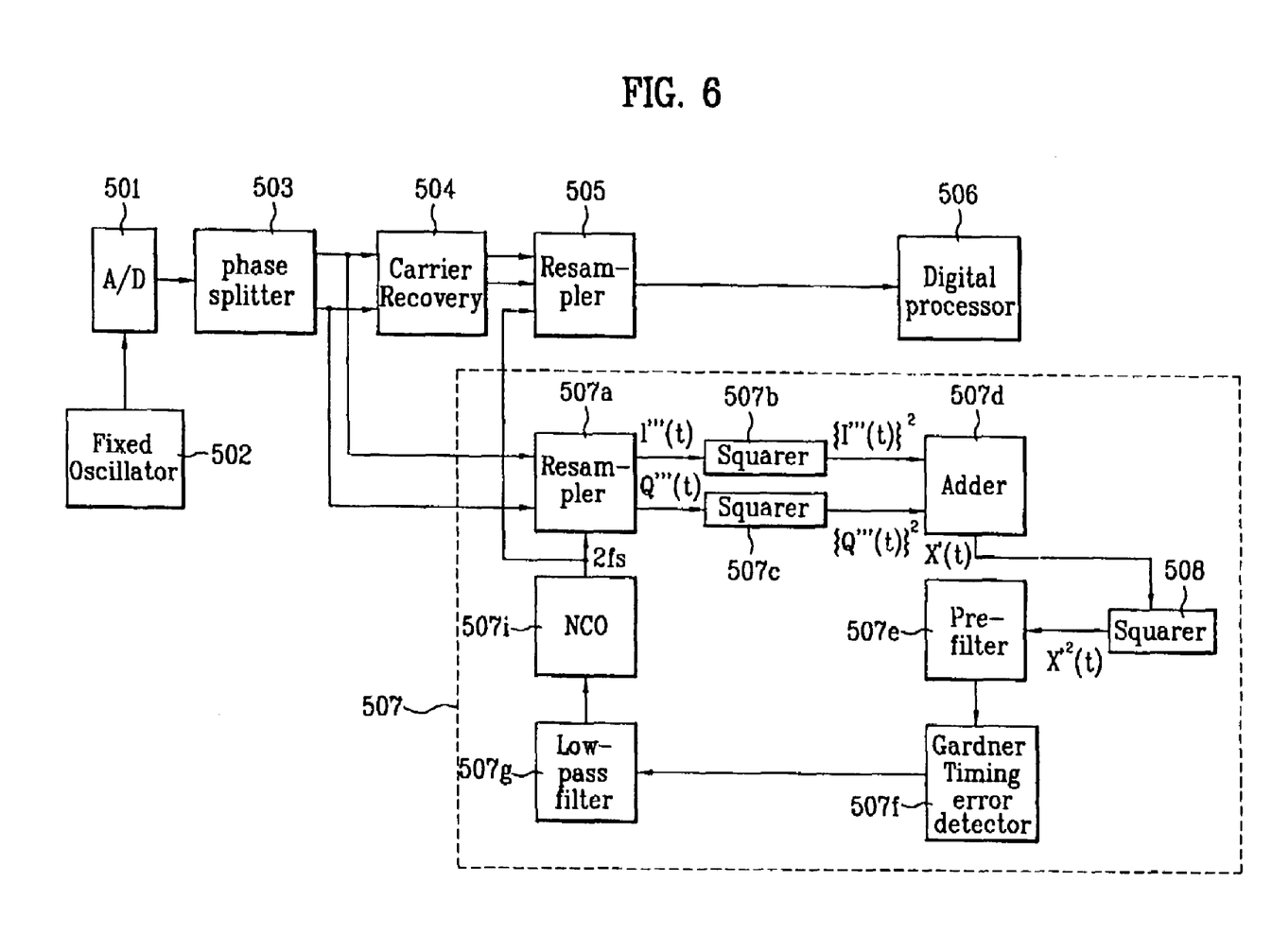
FIG. 6 is a block diagram illustrating a digital TV receiver having a symbol clock recovery according to a third embodiment of the present invention.
Figure 7:
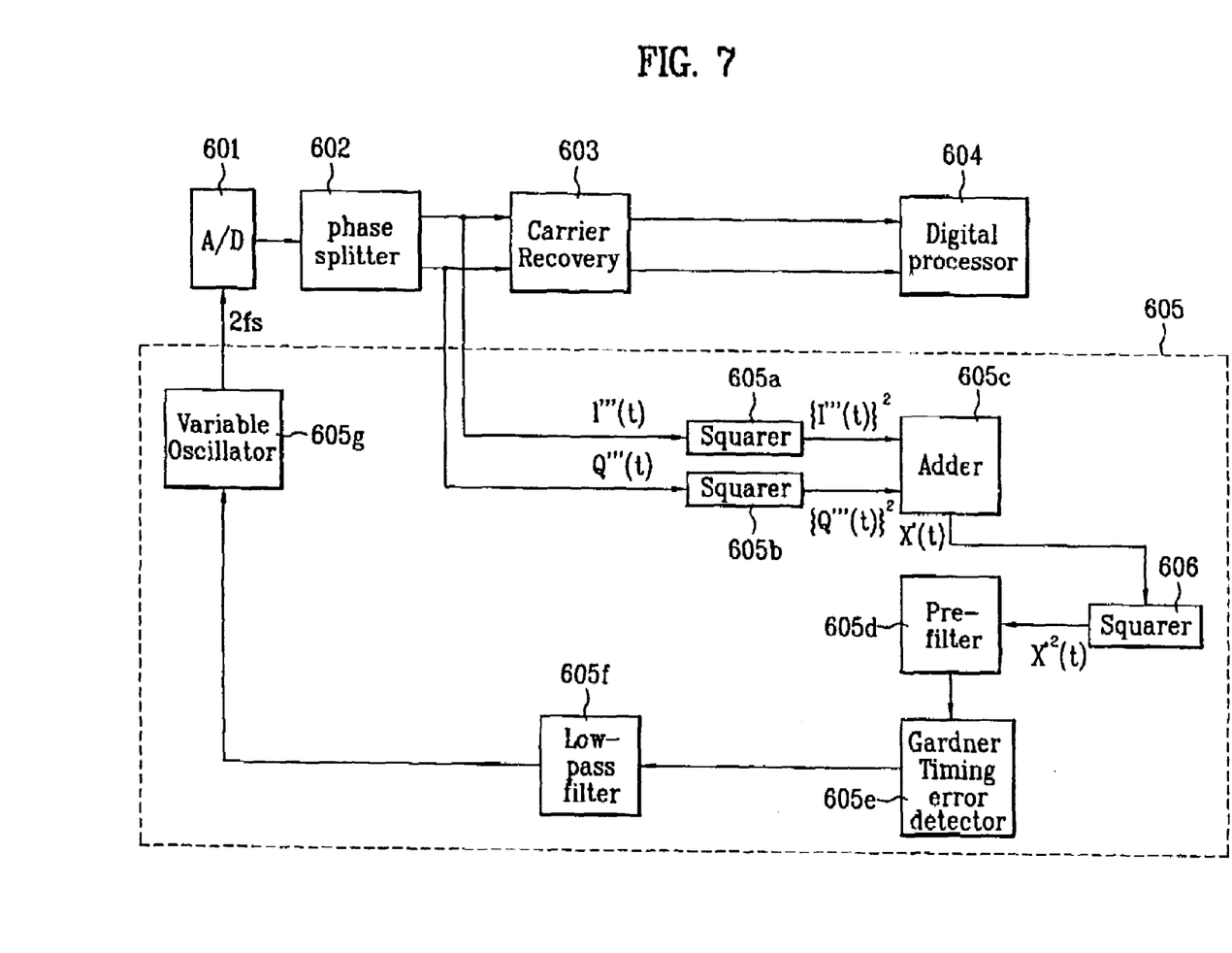
FIG. 7 is a block diagram illustrating a digital TV receiver having a symbol clock recovery according to a fourth embodiment of the present invention.

FIGS. 6 and 7 are preferred embodiments of that. FIG. 6 is an example showing that the A/D converter employs the fixed oscillator and thus the resampler is further included. FIG. 7 is an example showing that the A/D converter employs the variable oscillator, and thus the resampler is removed.

First, the A/D converter 501 samples the analog passband signal and converts into the digital passband signal at the fixed oscillating frequency generated from the fixed oscillator 502. The digital passband signal is outputted to the carrier recovery 504 through the phase splitter 503 and to the symbol clock recovery 507 for recovering the symbol clock.

The carrier recovery 504 multiplies a standard carrier signal completed the carrier recovery by the digital passband I and Q signals outputted through a phase splitter 503, transits the passband I and Q signals into the baseband I and Q signals, and outputs to a resampler 505 to convert into the symbol-recovered signal. The resampler 505 samples the baseband I and Q signals at the two times frequency of the symbol clock frequency (2fs) outputted from the symbol clock recovery 507 and outputs the sampling to a digital processor 506.

Meanwhile, the symbol clock recovery 507 includes a resampler 507a for sampling the digital passband I and Q signals outputted from the phase splitter 503 for two times the frequency of the symbol clock (2fs), a first squarer 507b for squaring a digital passband real number signal (I"(t)) outputted from the resampler 507a, a second squarer 507c for squaring the imaginary number signal (Q"(t)), an adder 507d for adding the two squared values outputted from the two squarers 507b and 507c, a pre-filter 507e for passing only an edge part in the output spectrum of the adder 507d, a Gardner timing error detector 507f for detecting information relating to timing error from the signals passed through the pre-filter 507e, a low-pass filter 507g for filtering only a low-pass signal component from the timing error information outputted from the Gardner timing error detector 507f and an NCO 507i for newly generating the two times frequency of the symbol clock (2fs) according to the low pass component of the timing error information, and controlling sampling timing of the resamplers 507a and 505.

The resampler 507a in the symbol clock recovery of the present invention performs sampling of the digital passband I and Q signals generated from the phase splitter 503 into the two times frequency of the symbol clock (2fs) generated from the NCO 507i and outputs the interpolated I and Q signals(I'"(t),Q'"(t)) to each of the squarers 507b and 507c. As nonlinear devices, the two squarers 507b and 507c squares each of the passband I and Q signals, and outputs to the adder 507d. The signals are converted into the baseband I and Q signals from which the carrier component is removed when the two squared signals are added together in the adder 507d.

The output of the adder 507d newly generates the two times frequency of the symbol clock after passing through the third squarer 508, the pre-filter 507e, the Gardner timing error detector 507f, the low-pass filter 507g and the NCO 507i in order. The resamplers 505 and 507a outputs the corrected signal using the new two times frequency of the symbol clock (2fs).

In this instance, a formula describing the passband I and Q signals (I'"(t), Q'"(t)) inputted to the two squarers 507b and 507c is described as following formula 7.

$I'''(t) = \{I(t)+P\} \cos(w_c t+\Psi) - Q(t)\sin(w_c t+\Psi)$ $Q'''(t) = \{I(t)+p\} \sin(w_c t+\Psi) + Q(t)\cos(w_c t+\Psi)$ [Formula 7]

The formula 7 shows that signals inputted to the squarers 507b and 507c are not passing through the carrier recovery 504, and the carrier remains therein.

If the passband I and Q signals (I'"(t), Q'"(t)) the carrier remains the same therein pass through each of the squarers 507b and 507c, the formula is shown as Formula 8.

$\{I'''(t)\}^2 = [\{I(t)+p\}\cos(w_c t+\Psi) -$ [Formula 8]

$Q(t)\sin(w_c t+\Psi)]^2$ $= \{I(t)+p\}^2\cos^2(w_c t+\Psi) +$ $Q^2(t)\sin^2(w_c t+\Psi) -$ $2\{I(t)+p\}Q(t)\cos(w_c t+\Psi)\sin(w_c t+\Psi)$ $\{Q'''(t)\}^2 = [\{I(t)+p\}\sin(w_c t+\Psi) +$ -continued
$Q(t)\cos(w_c t+\Psi)]^2$ $= \{I(t)+p\}^2\sin^2(w_c t+\Psi) +$ $Q^2(t)\cos^2(w_c t+\Psi) +$ $2\{I(t)+p\}Q(t)\sin(w_c t+\Psi)\cos(w_c t+\Psi)$ The formula 8 shows that the carrier remains the same. However, the carrier signal component is removed as in Formula 9 if the output of each of the two squarers 507b and 507c such as the formula 8 is added to the adder 507d.

$X(t)=I^2(t)=Q^2(t)=p^2=2pI(t)$ [Formula 9]

Therefore, there is an advantage of using the symbol clock recovery as FIG. 6 that the symbol clock is recovered from the passband signals without being interfered by the carrier.

In other words, there is an advantage that the symbol clock is recovered in a precise and stable way without passing through the carrier recovery, that used to be a mandatory process for the symbol clock recovery in the embodiment of FIG. 6. This describes that the symbol clock recovery 507 is able to operate and perform more stable symbol clock recovery regardless of the carrier signal component.

FIG. 7 describes the A/D converter 601 samples the analog passband signal at the two times frequency of the symbol clock frequency (2fs) generated from the variable oscillator instead of the fixed oscillator of FIG. 6, and converting the signal into the digital passband signal. Here, a digital processor 604 and a pre-filter 605d of FIG. 7 performs the same operation and function as the digital processor 506 and the pre-filter 507e of FIG. 6, respectively.

The symbol clock recovery 605 performs the symbol clock recovery using the passband I and Q signals outputted from the phase splitter 602 as well.

In FIG. 7, the A/D converter 601 performs sampling by receiving the two times frequency of the symbol clock frequency (2fs), and the resampler is not required.

The symbol clock recovery 605 includes a first squarer 605a for squaring the digital passband real number signal (I'"(t)) being split and outputted from the phase splitter 602, a second squarer 605b for squaring the imaginary signal (Q'"(t)), an adder 605c for adding the two squared values ($\{I'''(t)\}^2,\{Q'''(t)\}^2$) outputted from the two squarers 605a and 605b, a third squarer 606 for squaring the output value of the adder 605c, a pre-filter for passing only the edge portion of the output spectrum of the third squarer 606, a low-pass filter 605f for filtering the low pass signal components from the timing error information outputted from the Gardner timing error detector 605e and a variable oscillator 605g for newly generating the two times frequency of the symbol clock frequency according to the low pass component of the timing error information, and outputting to the A/D converter 601.

In such case of FIG. 7, the A/D converter 601 samples the analog passband signal at the two times frequency of the symbol clock frequency and converts into the digital passband signal. Therefore, the resampler is not required and burden on the hardware is reduced.

The output of the low pass filter 605f performing low pass filtering on the current timing error information detected from the Gardner timing error detector 605e is inputted to the variable oscillator 605g generating new two times the frequency of the symbol clock and two times frequency (2fs)

generated by using the low pass filtered timing error information from the variable oscillator 605g are inputted to the A/D converter 601. In this case, the roles of the first and second squarers 605a and 605b, the adder 605c, the third squarer 606, the pre-filter 605d, the Gardner timing error detector 605e and the low pass filter 605f are the same as the same blocks of FIG. 6.

In other words, the digital passband I and Q signals (I'''(t), Q'''(t)) inputted to the two squarers 605a and 605b is the same as the formula 7, the two squared signals ({I'''(t)}$^2$, {Q'''(t)}$^2$) outputted from the two squarers 605a and 605b are the same as the formula 8 and the output signal (X'(t)) from the additoner 605c is the same as the formula 9.

Therefore, there is an advantage of using the symbol clock recovery 605 of FIG. 7 that the symbol clock is recovered from the passband signal without being interfered by the carrier and the complexity of the hardware can be reduced resulted in removing of the resampler.

As mentioned above, there is an advantage that the symbol clock recovery is precisely and stably carried out from the signals not passed the carrier recovery 603, that is the mandatory process for the symbol clock recovery in the embodiment of FIG. 7. This describes that the symbol clock recovery 605 is able to operate and perform more stable symbol clock recovery regardless of the carrier signal component.

Figure 8:
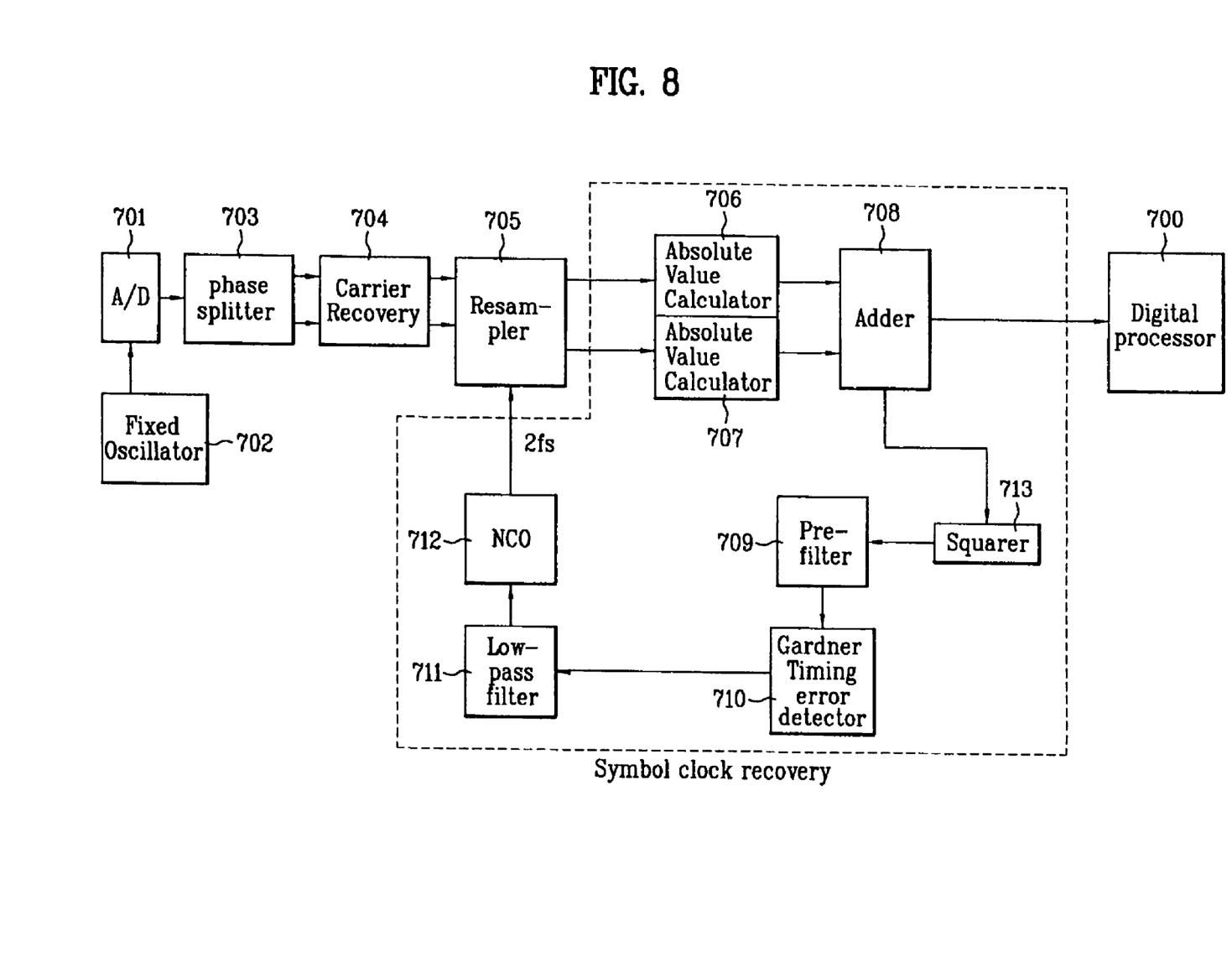
FIG. 8 is a block diagram illustrating a digital TV receiver having a symbol clock recovery according to a fifth embodiment of the present invention.

The symbol clock recovery in the embodiments of FIG. 3 and FIG. 7 employed two squarers and adders to the inputted signals for preventing reduced performance resulted from the incomplete performance of the carrier recovery. However, the squarer has a disadvantage that the size is getting larger when the hardware is employed and absolute value operators 706 and 707 can be employed instead of the squarer as described in FIG. 8. The symbol clock recovery not being interfered by the carrier modulator is realized to reduce the burden on the hardware and a carrier demodulator in FIG. 8. FIG. 8 is an embodiment showing the A/D converter 701 converts the analog passband signal into the digital passband signal using the fixed frequency generated from the fixed oscillator 702. Here, a digital processor 700 and a squarer 713 of FIG. 8 performs the same operation and function as the digital processor 313 and the squarer 314 of FIG. 3, respectively.

First, the analog passband signal inputted to the A/D converter 701 is sampled as the output frequency of the fixed oscillator 702 and converted into the digital signal. The output of the A/D converter 701 is passed through the phase splitter 703, the carrier recovery 704 and the resampler 705, and then, inputted to the absolute operators 706 and 707. The absolute value calculators 706 and 707 apply an absolute value to each of the digital baseband I and Q signals interpolated as two times the frequency of the symbol clock at the resampler 705 and outputted, and outputs to the adder 708 to add. Influence of the carrier recovery 704 is totally removed from the output of the adder 708 as the same as the case the squarer is employed. The output of the adder 708 passes through the third squarer 713, the pre-filter 709, the Gardner timing error detector 710 and the low pass filter 711, and inputted to the NCO 712 to generate the two times the frequency of the symbol clock.

As another embodiment of FIG. 8, the A/D converter 701 may receive the two symbol clock frequencies (2fs) from the variable oscillator instead of the fixed oscillator, and convert the analog passband signal into the digital passband signal using the two absolute value calculating unit instead of the two squarers. In this case, the resampler is not required.

As the same in the case of FIG. 8, if the symbol clock recovery is carried out from the output of the adder 708, the symbol clock recovery can be performed without being influenced by the carrier.

In the embodiment of FIG. 3 and FIG. 7, the symbol clock recovery can be carried out nevertheless the two squarers are replaced with the two absolute value calculating unit.

According to the digital TV receiver of the present invention, the symbol clock recovery is able to perform without being influenced by the remained carrier component after removing the remained carrier component using the two squarers and the adder. Therefore, the symbol clock recovery performs recovering symbol clock more stably even in the case the carrier recovery is not completely carried out.

Particularly, the present invention has an advantage that the symbol clock is recovered without being influenced by the carrier in case the symbol clock recovery is performed from the digital passband signal. Also, the burden on the hardware can be reduced using the two absolute calculating unit instead of the two sqaurers.

As aforementioned, the symbol clock recovery performs without being influenced by the incomplete carrier component although the carrier recovery performs incomplete carrier recovery because of a heavy linear noise, i.e., ghost in a transmission channel. Therefore, the performance of the symbol clock recovery is enhanced, the burden on the hardware is reduced, and particularly, the carrier recovery let information on the rear of the channel equalizer used.

Also, the present invention includes the squarer between the adder and the pre-filter, and therefore the symbol clock recovery is performed even when the half frequency of the symbol clock frequency taking the timing information is severely distorted or disappeared by the ghost and the like.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A digital TV receiver, comprising:
   an A/D converter for converting an analog passband signal into a digital passband signal;
   a carrier recovery for converting the digital passband signal into a digital baseband signal; and
   a symbol clock recovery for detecting timing error information by calculating digital-real/imaginary-passband-signals of the A/D converter or digital-real/imaginary-baseband-signals of the carrier recovery and squaring the calculated result, and for generating and outputting two times the frequency of a symbol clock corrected from the detected timing error information.

2. The digital TV receiver of claim 1 further comprising a fixed oscillator for oscillating at a fixed frequency, wherein the A/D converter converts the analog passband signal into the digital passband signal by sampling the analog signal at the fixed frequency generated by the fixed oscillator or by sampling the analog passband signal with two times the frequency of the symbol clock.

3. The digital TV receiver of claim 2, wherein the fixed frequency generated from the fixed oscillator is higher than the two times the frequency of the symbol clock.

4. The digital TV receiver of claim 1, wherein the carrier recovery multiplies a standard carrier signal by the digital passband signal through the carrier recovery and converts into the digital baseband signal.

5. The digital TV receiver of claim 1 further comprising a first resampler for resampling the digital real/imaginary baseband signals into the two times frequency of the symbol clock frequency and interpolating each of the signals.

6. The digital TV receiver of claim 5, wherein the symbol clock recovery comprises:
an operator for calculating each of the digital real/imaginary baseband signals interpolated and outputted from the first resampler, and outputting the calculation;
a squarer for squaring the output value of the operator;
a pre-filter for passing only a frequency of a particular band to recover the symbol clock from the output of the squarer;
a timing error detector for detecting timing error information from the output of the pre-filter;
a filtering unit for filtering only the low passband signal from the timing error information outputted from the timing error detector; and
a NCO for generating two times the frequency of the symbol clock recovered according to low pass signals of the filtered timing error information and outputting to the first resampler.

7. The digital TV receiver of claim 6, wherein the operator squares each of the digital baseband real/imaginary signals interpolated and outputted from the first resampler, adds the two squared signals, and outputs the calculated result; or calculates an absolute value for each of the digital baseband real number/imaginary signals interpolated and outputted from the first resampler, adds the absolute value of the two signals, and outputs the calculation.

8. The digital TV receiver of claim 5, wherein the symbol clock recovery comprises:
a second resampler for resampling the digital passband real/imaginary signals outputted from the A/D converter into the two times frequency of the symbol clock frequency and interpolating each of the signals;
an operator for calculating the digital passband real/imaginary signals outputted from the second resampler and outputting the calculation;
a squarer for squaring the output value of the operator;
a pre-filter for passing only a frequency of a particular band to recover the symbol clock from the output of the squarer;
a timing error detector for detecting timing error information from the output of the pre-filter;
a filtering unit for filtering only the low passband signal from the timing error information outputted from the timing error detector; and
a NCO for generating two times the frequency of the symbol clock recovered according to low pass signal component of the filtered timing error information and outputting to the first and the second resamplers.

9. The digital TV receiver of claim 8, wherein the operator squares each of the digital passband real/imaginary component signals interpolated and outputted from the second resampler, adds the two squared signals, and outputs the calculated result; or calculates an absolute value for each of the digital passband real/imaginary component signals interpolated and outputted from the second resampler, adds the absolute value of the two signals, and outputs the calculation.

10. The digital TV receiver of claim 1, wherein the symbol clock recovery comprises:
an operator for calculating each of the digital baseband real/imaginary signals outputted from the carrier recovery, and outputting the calculation;
a squarer for squaring the output value of the operator;
a pre-filter for passing only a frequency of a particular band to recover the symbol clock from the output of the squarer;
a timing error detector for detecting timing error information from the output of the pre-filter;
a filtering unit for filtering only the low passband signal from the timing error information outputted from the timing error detector; and
a variable oscillator for generating two times the frequency of the symbol clock recovered according to low pass signal component of the filtered timing error information and outputting to the A/D converter.

11. The digital TV receiver of claim 10, wherein the operator squares each of the digital baseband real/imaginary signals outputted from the carrier recovery, adds the two squared signals, and outputs the calculation; or calculates an absolute value for each of the digital baseband real/imaginary component signals outputted from the carrier recovery, adds the absolute value of the two signals, and outputs the calculation.

12. The digital TV receiver of claim 1, wherein the symbol clock recovery comprises:
an operator for calculating each of the digital passband real/imaginary signals outputted from the A/D converter, and outputting the calculation;
a squarer for squaring the output value of the operator;
a pre-filter for passing only a frequency of a particular band to recover the symbol clock from the output of the squarer;
a timing error detector for detecting timing error information from the output of the pre-filter;
a filtering unit for filtering only the low passband signal from the timing error information outputted from the timing error detector; and
a variable oscillator for generating two times the frequency of the symbol clock recovered according to low pass signals of the filtered timing error information and outputting to the A/D converter.

13. The digital TV receiver of claim 12, wherein the operator squares each of the digital passband real/imaginary component signals outputted from the A/D converter, adds the two squared signals, and outputs the calculation; or calculates an absolute value for each of the digital passband real/imaginary component signals outputted from the A/D converter, adds the absolute value of the two signals, and outputs the calculation.

14. A digital TV receiver, comprising:
an A/D converter for taking a sample of a fixed frequency from an analog passband signal and converting into a digital passband signal;
a carrier recovery for multiplying a standard carrier signal generated from the process of the carrier recovery of the digital passband signal and converting into the digital baseband signal;
a first resampler for taking a sample of two times the frequency of the symbol clock from the digital baseband real/imaginary signals generated from the carrier recovery and interpolating; and
a symbol clock recovery for detecting timing error information by calculating the digital passband signal or the digital baseband signal and squaring the calculated result, and for generating and outputting the two times frequency of the symbol clock frequency corrected from the detected timing error information.

15. The digital TV receiver of claim 14, wherein the symbol clock recovery comprises:
an operator for calculating the digital baseband real/imaginary signals interpolated and outputted from the first resampler;
a squarer for squaring the output value of the operator;
a pre-filter for passing only a frequency of a particular band to recover the symbol clock from the output of the squarer;
a timing error detector for detecting timing error information from the output of the pre-filter;
a filtering unit for filtering only the low passband signals from the timing error information outputted from the timing error detector; and
a NCO for generating two times the frequency of the symbol clock recovered according to low pass signals of the filtered timing error information and outputting to the first resampler.

16. The digital TV receiver of claim 15, wherein the operator squares each of the digital baseband real/imaginary signals interpolated and outputted from the first resampler, adds the two squared signals, and outputs the calculation; or calculates an absolute value for each of the digital baseband real/imaginary signals interpolated and outputted from the first resampler, adds the absolute value of the two signals, and outputs the calculation.

17. The digital TV receiver of claim 14, wherein the symbol clock recovery comprising:
a second resampler for resampling the digital passband real/imaginary signals outputted from the A/D converter into the two times frequency of the symbol clock frequency and interpolating each of the signals;
an operator for calculating the digital passband real/imaginary signals outputted from the second resampler and outputting the calculation;
a squarer for squaring the output value of the operator;
a pre-filter for passing only a frequency of a particular band to recover the symbol clock from the output of the squarer;
a timing error detector for detecting timing error information from the output of the pre-filter;
a filtering unit for filtering only the low passband signal from the timing error information outputted from the timing error dector; and
a NCO for generating two times the frequency of the symbol clock recovered according to low pass signal component of the filtered timing error information and outputting to the first resampler and the second resampler.

18. The digital TV receiver of claim 17, wherein the operator squares each of the digital passband real/imaginary signals interpolated and outputted from the second resampler, adds the two squared signals, and outputs the calculation; or calculates an absolute value for each of the digital passband real/imaginary signals interpolated and outputted from the second resampler, adds the absolute value of the two signals, and outputs the calculation.

19. A digital TV receiver, comprising:
an A/D converter for sampling an analog passband signal with two times the frequency of a symbol clock for converting the analog passband signal into a digital passband signal;
a carrier recovery for multiplying a standard carrier signal generated from the process of the carrier recovery by the digital passband signal and converting into the digital baseband signal; and
a symbol clock recovery for detecting timing error information by calculating the digital passband signal or the digital baseband signal and squaring the calculated result, and for generating and outputting the two times frequency of the symbol clock frequency corrected from the detected timing error information.

20. The digital TV receiver of claim 19, wherein the symbol clock recovery comprises:
an operator for calculating each of the digital baseband real/imaginary signals outputted from the carrier recovery, and outputting the calculation;
a squarer for squaring the output value of the operator;
a pre-filter for passing only a frequency of a particular band to recover the symbol clock from the output of the squarer;
a timing error detector for detecting timing error information from the output of the pre-filter;
a filtering unit for filtering only the low passband signal from the timing error information outputted from the timing error detector; and
a variable oscillator for generating two times the frequency of the symbol clock recovered according to low pass signal component of the filtered timing error information and outputting to the A/D converter.

21. The digital TV receiver of claim 20, wherein the operator squares each of the digital baseband real/imaginary signals outputted from the carrier recovery, adds the two squared signals, and outputs the calculation; or calculates an absolute value for each of the digital baseband real/imaginary signals interpolated and outputted from the carrier recovery, adds the absolute value of the two signals, and outputs the calculation.

22. The digital TV receiver of claim 19, wherein the symbol clock recovery comprises:
an operator for calculating each of the digital passband real/imaginary signals outputted from the A/D converter, and outputting the calculation;
a squarer for squaring the output value of the operator;
a pre-filter for passing only a frequency of a particular band to recover the symbol clock from the output of the squarer;
a timing error detector for detecting timing error information from the output of the pre-filter;
a filtering unit for filtering only the low passband signal from the timing error information outputted from the timing error detector; and
a variable oscillator for generating two times the frequency of the symbol clock recovered according to low pass signal component of the filtered timing error information, and outputting to the A/D converter.

23. The digital TV receiver of claim 22, wherein the operator squares each of the digital passband real/imaginary signals outputted from the A/D converter, adds the two squared signals, and outputs the calculation; or calculates an absolute value for each of the digital passband real/imaginary signals outputted from the A/D converter, adds the absolute value of the two signals, and outputs the calculation.

* * * * *